United States Patent
Kruppa et al.

(10) Patent No.: US 9,637,065 B2
(45) Date of Patent: May 2, 2017

(54) PLASTICS MATERIAL DECORATIVE PART

(75) Inventors: Bernd Kruppa, Mitwitz (DE);
Manuela Körner, Lichtenfels (DE)

(73) Assignee: Kunststoff-Technik Scherer & Trier GmbH & Co. KG, Michelau in Oberfranken (DE)

(*) Notice: Subject to any disclaimer, the term of this patent is extended or adjusted under 35 U.S.C. 154(b) by 0 days.

(21) Appl. No.: 13/422,529

(22) Filed: Mar. 16, 2012

(65) Prior Publication Data
US 2012/0237739 A1    Sep. 20, 2012

(30) Foreign Application Priority Data
Mar. 18, 2011    (DE) .................... 20 2011 004 149 U

(51) Int. Cl.
*B60R 13/02*    (2006.01)

(52) U.S. Cl.
CPC ....... *B60R 13/02* (2013.01); *Y10T 428/24802* (2015.01)

(58) Field of Classification Search
CPC .............................................. Y10T 428/24802
USPC ........................................................... 428/29
See application file for complete search history.

(56) References Cited

U.S. PATENT DOCUMENTS

| | | | |
|---|---|---|---|
| 6,887,573 B2* | 5/2005 | Vollenberg et al. | 428/412 |
| 2001/0023011 A1* | 9/2001 | Preisler et al. | 428/156 |
| 2009/0013906 A1* | 1/2009 | Fischer et al. | 106/482 |

* cited by examiner

*Primary Examiner* — Gerard Higgins
(74) *Attorney, Agent, or Firm* — Kenneth E. Horton; Kirton McConkie

(57) ABSTRACT

The present invention is related to a plastics material decorative part, a Plastics material decorative part, preferably for a motor vehicle, comprising: a surface having a first region in which the surface is provided with a high-gloss finish, and having a second region which is formed as a portion of the first region, a decoration, which is provided in the second region and applied by hot stamping to the surface provided with a high-gloss finish.

20 Claims, 5 Drawing Sheets

(A-A)

(B-B)

(C-C)

(D-D)

(E-E)

(F-F)

PLASTICS MATERIAL DECORATIVE PART

FIELD OF THE INVENTION

The invention relates to a plastics material decorative part, preferably for a motor vehicle.

TECHNICAL BACKGROUND

Although the present invention can be applied to a wide range of plastics material parts for decorative and trim purposes, for example in the field of automotive engineering, but also in other technical fields, for example when equipping any vehicles, aircraft or buildings, and also in domestic appliances or entertainment devices, the invention and the problem on which it is based are described in detail below with reference to a trim component for a motor vehicle, but without restricting the invention to that effect.

In the context of motor vehicles, in particular cars, vendors and users now require not only efficient drive technology, low fuel consumption and the like, but also a high-grade and aesthetic appearance. Decorative or trim components for the interior of motor vehicles are currently often produced from plastics material, at least in part. This allows the cost-effective production of complicated geometries with a simultaneous reduction in weight.

In this context, it can happen that a trim component of this type is of a high-gloss design for aesthetic reasons and is to be embellished in particular, predefined regions with a decoration, for example a chrome-look decoration.

For this purpose, the trim component can be implemented in two or more separate pieces, one of the pieces being provided with a high-gloss surface and a second of the pieces being provided with a chrome finish or another decoration. For this purpose, the second piece may for example be chromium-plated. However, a two-piece or multi-piece design is associated with high complexity and high costs, especially since the pieces must be produced individually and then assembled.

This is a situation which is worth improving.

SUMMARY OF THE INVENTION

Against this background, the object of the present invention is to provide a plastics material decorative part which is aesthetic and at the same time can also be produced in an advantageous and cost-effective manner.

According to the invention, this object is achieved by a plastics material decorative part having the features of claim 1.

A plastics material decorative part, in particular for a motor vehicle, is accordingly provided, which part comprises a surface which is provided with a high-gloss finish in a first region of the surface. The surface also comprises a second region which is formed as a portion of the first region. In this case, in the second region a decoration is applied by hot stamping to the surface provided with a high-gloss finish.

The idea on which the present invention is based consists in applying the decoration by hot stamping to the surface which is provided with a high-gloss finish in the first region and thus also in the second region, which is formed as a portion of the first region. As a result, a complex, multi-piece formation of the plastics material decorative part comprising a piece provided with a high-gloss finish and a further piece decorated in another manner can be avoided. The plastics material decorative part according to the invention can thus be produced more cost-effectively overall and requires less complexity, since in particular assembly can also be dispensed with.

During production of the plastics material decorative part according to the invention it is also possible to omit the time-consuming step of providing the surface with a mask prior to finishing in order to produce a lacquer-free region on the surface for decoration by hot stamping.

In the present case, the term hot stamping, sometimes also referred to as heat sealing, is to be understood to mean a method in which a decoration from a hot-stamping or heat-sealing foil is applied to a substrate and fixed thereon using heat and pressure. Hot stamping allows high-grade decorations to be produced with great freedom with regard to the visual styling thereof.

Advantageous configurations and developments of the invention emerge from the further dependent claims and from the description with reference to the figures of the drawings.

In one configuration, the decoration is applied in the second region by heating and simultaneously pressing a hot-stamping foil onto the surface provided with a high-gloss finish. This allows high-quality, economical decoration of the surface.

In a development of the invention, the high-gloss finish is formed using a coat of lacquer applied to the plastics material decorative part in the first region. In this case, the thickness of the coat of lacquer is between 10 µm and 50 µm, preferably between 20 µm and 28 µm. A plastics material decorative part of this type is visually attractive and has a high-grade appearance.

According to another development, the high-gloss finish is formed using a plurality of coats of lacquer applied one on top of another to the plastics material decorative part in the first region. In this case, the overall thickness of the coats of lacquer is between 10 µm and 50 µm, preferably between 20 µm and 28 µm. In this development, too, an aesthetic plastics material decorative part having a high-grade appearance can be achieved.

In a further development, the high-gloss finish is formed using a plurality of coats of lacquer applied one on top of another to the plastics material decorative part in the first region, the thickness of the uppermost coat of lacquer being between 10 µm and 50 µm, preferably between 20 µm and 28 µm. This development also makes it possible to provide the plastics material decorative part with a perfect, visually attractive visible side.

In a configuration of the invention, the high-gloss finish is implemented using a piano lacquer or, alternatively, using a lacquer which after drying basically resembles a piano lacquer. In this case, a black piano lacquer, or a lacquer which after drying resembles a black piano lacquer, is preferably used. Plastics material decorative parts of this configuration make a superior impression on the viewer.

In a further development, the second region is limited by a boundary which extends, at least in portions, in the region of an edge of the plastics material decorative part. As a result, the decoration can be given even more effective visual emphasis.

In one configuration, the plastics material decorative part is formed as a trim component for a motor vehicle, in particular a trim component for the passenger compartment of the motor vehicle. A trim component of this type for a motor vehicle can be produced particularly cost-effectively and has a visually attractive appearance.

According to a further configuration, the plastics material decorative part is implemented as a plastics material panel._

In this case, the plastics material panel is formed to be mounted in the interior of a motor vehicle so as to be visible, at least in portions.

In a development of the invention, the plastics material decorative part is formed as a plastics material panel for part of a cockpit or a centre console of a motor vehicle. In this part of the motor vehicle interior, the plastics material decorative part is clearly visible for the driver and can produce its aesthetic effect particularly well.

In a configuration of the invention, the plastics material decorative part is formed using a main body made of a thermoplastic polymer. Plastics material decorative parts of this type can be produced economically by injection moulding.

The above-mentioned configurations and developments can, if appropriate, be combined with one another as desired. Further possible developments, configurations and implementations of the invention also include not explicitly mentioned combinations of features of the invention described above or below with regard to the embodiments. In this context, the person skilled in the art will in particular also add individual aspects as improvements or supplements to the respective basic form of the present invention.

SUMMARY OF THE DRAWINGS

The present invention is described in detail below with reference to the embodiments shown in the schematic figures of the drawings, in which.

Figure 1:
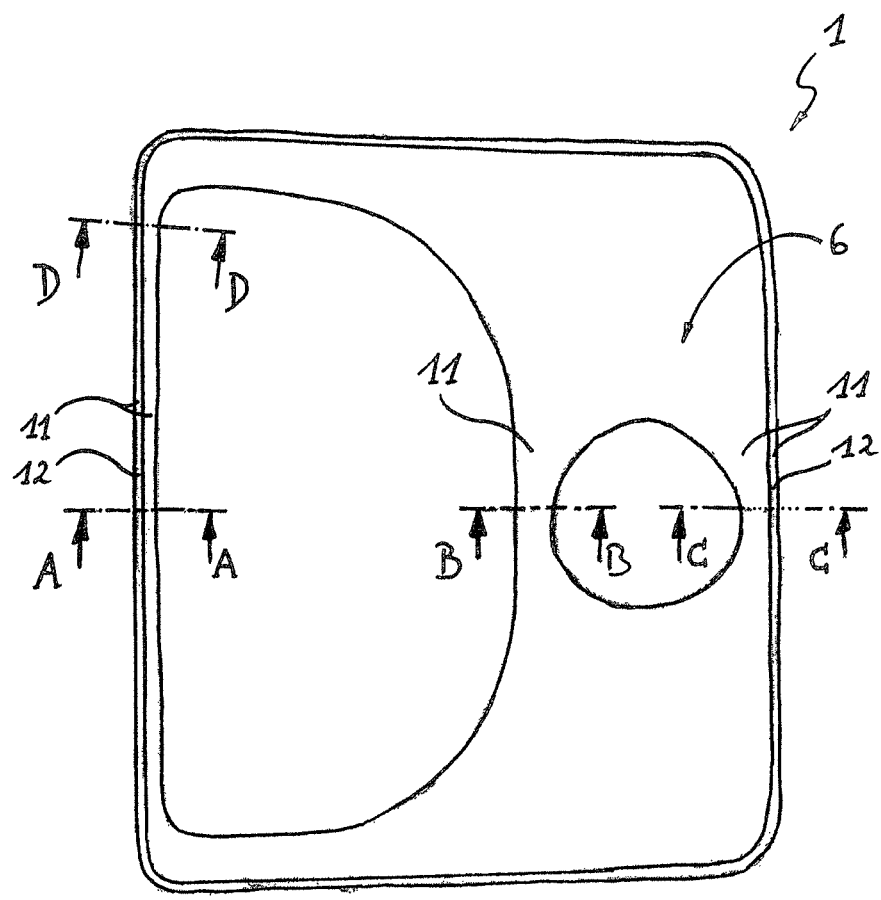
FIG. 1 is a front view of a plastics material decorative part according to an embodiment of the invention.

The appended drawings are intended to facilitate better understanding of the embodiments of the invention. They depict embodiments and serve, in connection with the description, to illustrate principles and approaches of the invention. Other embodiments and many of the advantages mentioned emerge with regard to the drawings. The elements of the drawings are not necessarily shown to scale in relation to one another.

In the figures of the drawings, elements, features and components which are like, functionally like or have the same effect are respectively provided with the same reference numerals, unless indicated otherwise.

DESCRIPTION OF EMBODIMENTS

Figure 2:
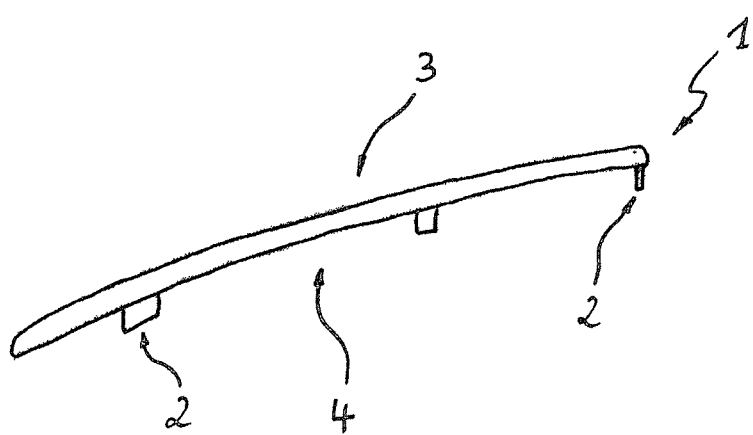
FIG. 2 is a side view of the plastics material decorative part of FIG. 1.
Figure 3:
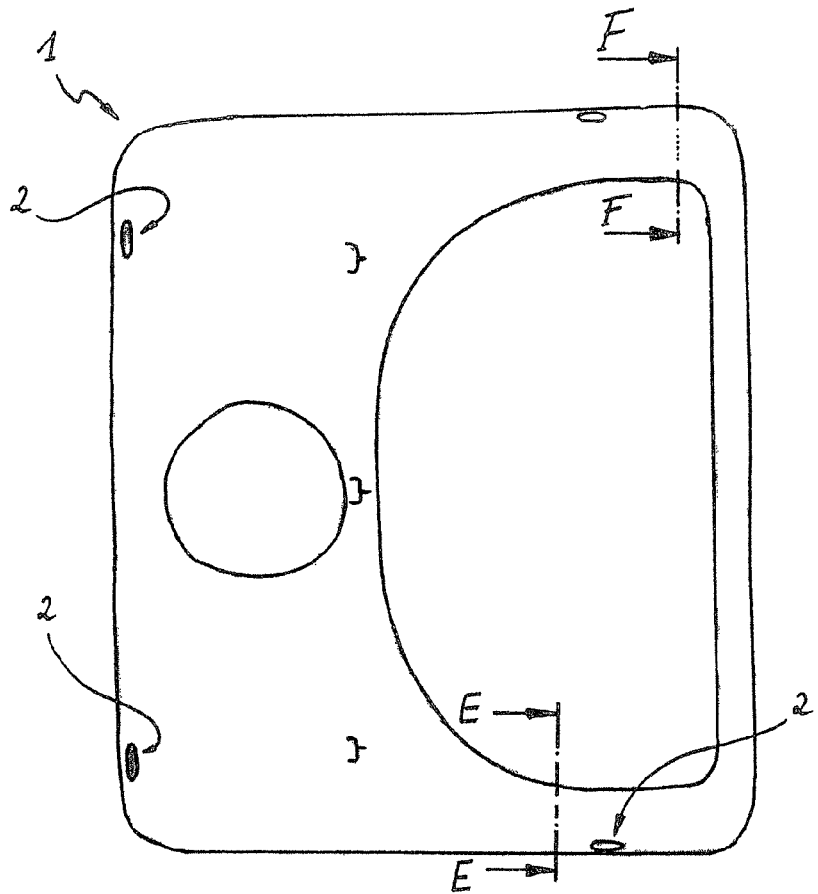
FIG. 3 is a rear view of the plastics material decorative part of FIG. 1.

FIGS. 1 to 3 show a plastics material decorative part according to an embodiment of the invention, which part is formed as a plastics material panel 1. The plastics material panel 1 is provided to be mounted in the interior or passenger compartment of a motor vehicle (not shown) in such a way that at least a portion of the plastics material panel 1 remains visible for the passenger or motor vehicle user. FIG. 2 is a side view of the plastics material panel 1 which, when mounted in the motor vehicle, comprises a visible side 3, which is visible at least in part, and a hidden side 4. The plastics material panel 1 is shown viewed from the visible side 3 thereof in FIG. 1, and from the hidden side 4 thereof in FIG. 3.

The plastics material panel 1 is used to cover functional components in the interior of the motor vehicle and in the example of FIG. 1 is fastened in a centre console or a cockpit of the motor vehicle, where it frames operating and/or display elements, for example an LCD display, for a navigation system, an on-board computer, a stereo system, an air-conditioning system or the like in an aesthetic and visually attractive manner and preferably also closes openings in the cockpit or centre console, for example for safety reasons. For mounting, the plastics material panel 1 of this embodiment comprises, in the region of its peripheral boundary, suitable fastening means 2. However, a plastics material panel 1 of the type shown in FIG. 1 can also be used in other locations in the passenger compartment, for example in a door trim, a rear trim of a seat or the like.

The plastics material panel 1 according to this embodiment is preferably produced from a thermoplastic polymer by injection moulding and comprises a surface 6. In a first region 11 of the surface 6 on the visible side 3, the plastics material panel 1 is provided with a high-gloss finish. The high-gloss finish in the first region 11 is preferably implemented using a piano lacquer, more preferably a black piano lacquer, or using a lacquer which after drying basically resembles a piano lacquer of this type.

The surface 6 of the plastics material panel 1 also comprises a second region 12. The second region 12 is formed as a portion of the first region 11. In the second region 12, a decoration is applied by hot stamping to the surface 6 provided with a high-gloss finish. For this purpose, the decoration is preferably transferred from a hot-stamping foil to the surface 6, which is provided with a high-gloss finish, in the second region 12 by the simultaneous use of heat and pressure.

Figure 4:
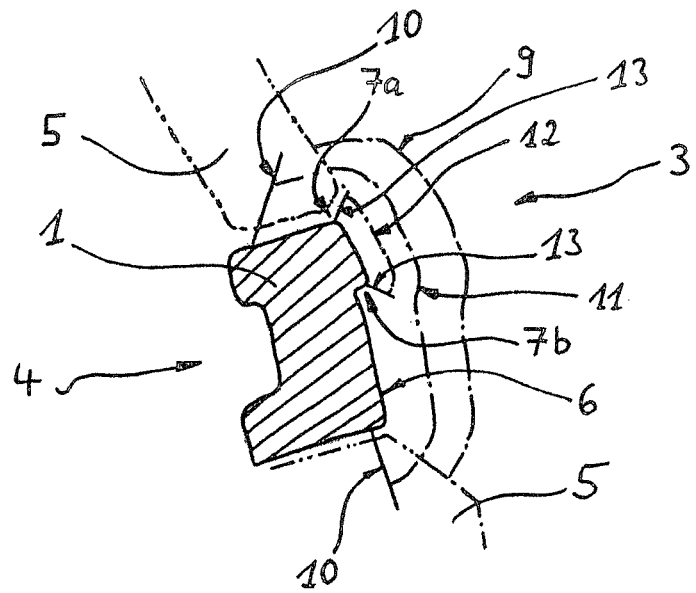
FIG. 4 is a sectional view A-A through the plastics material decorative part of FIG. 1, as indicated in FIG. 1.
Figure 5:
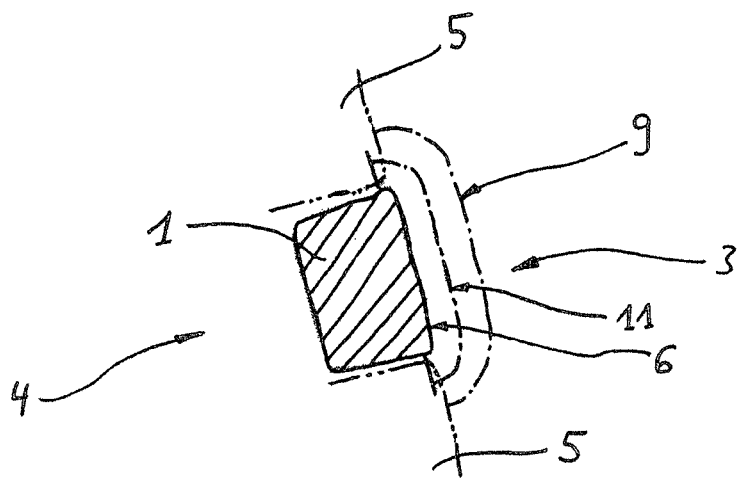
FIG. 5 is a sectional view B-B through the plastics material decorative part of FIG. 1, as indicated in FIG. 1.
Figure 6:
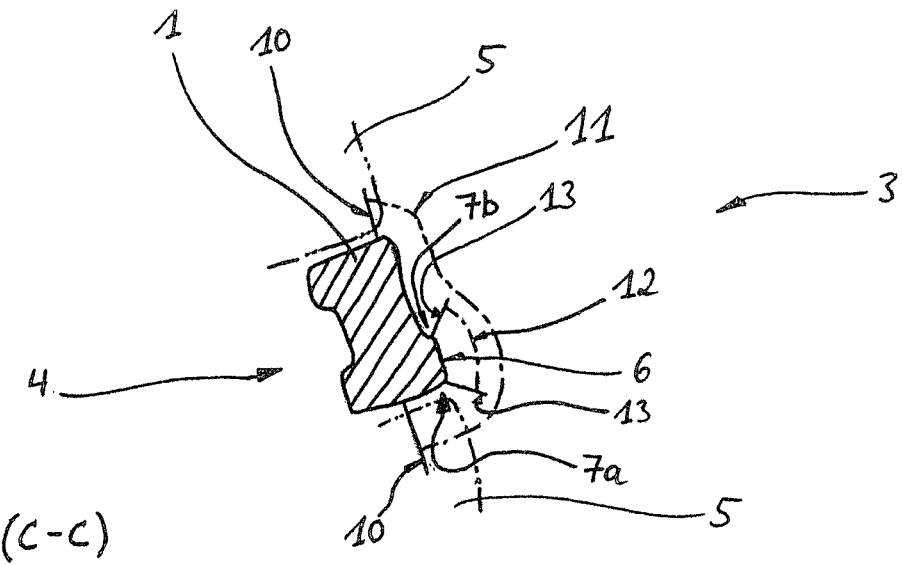
FIG. 6 is a sectional view C-C through the plastics material decorative part of FIG. 1, as indicated in FIG. 1.
Figure 7:
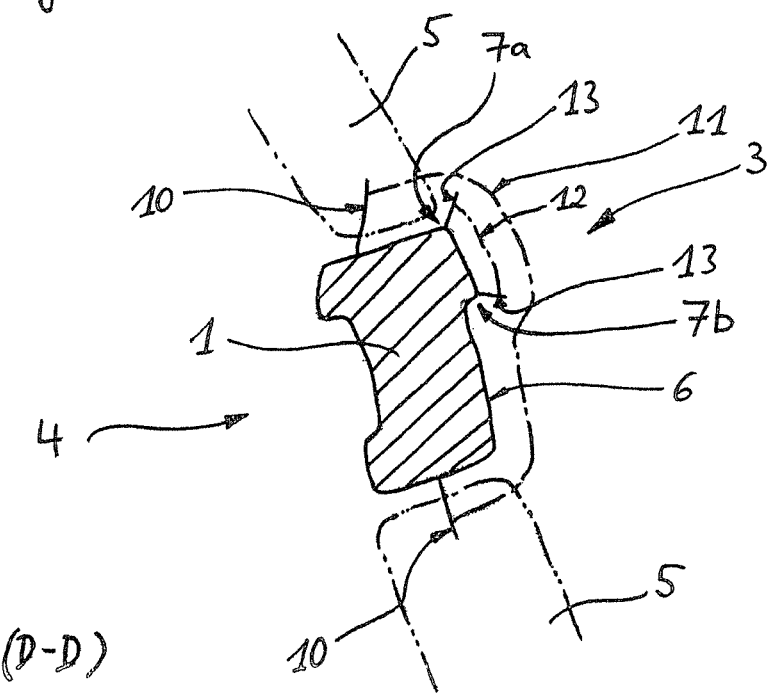
FIG. 7 is a sectional view D-D through the plastics material decorative part of FIG. 1, as indicated in FIG. 1.
Figure 8:
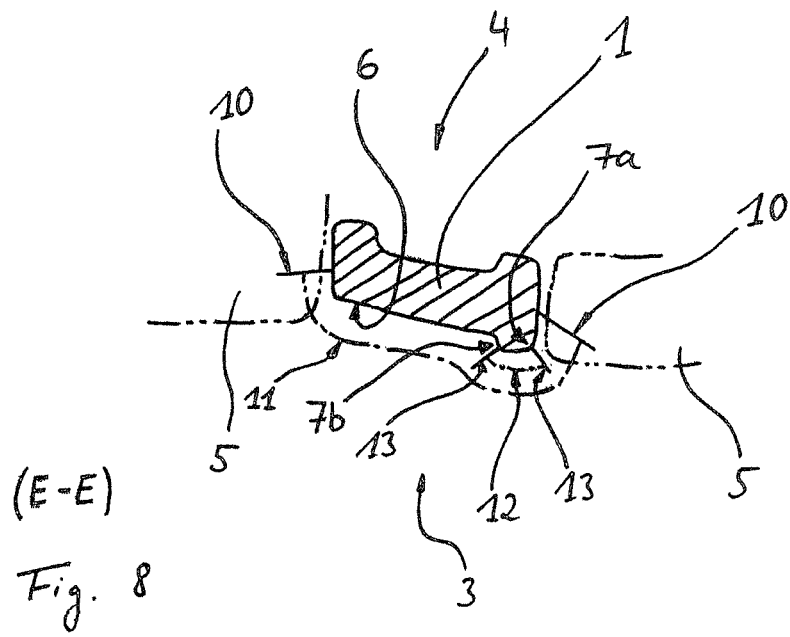
FIG. 8 is a sectional view E-E through the plastics material decorative part of FIG. 1, as indicated in FIG. 3.
Figure 9:
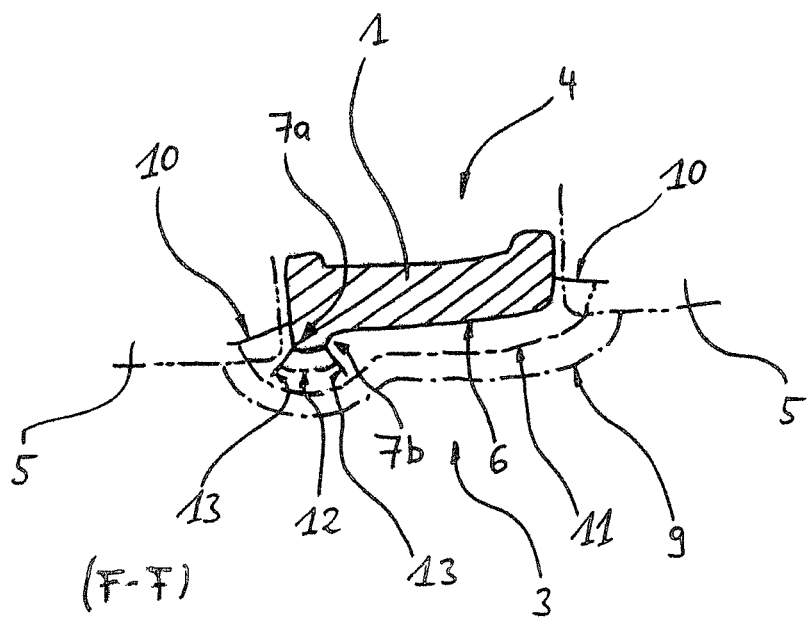
FIG. 9 is a sectional view F-F through the plastics material decorative part of FIG. 1, as indicated in FIG. 3.

FIGS. 4 to 9 are sectional views A-A, B-B, C-C, D-D, E-E and F-F at the points of the plastics material panel 1 shown in FIGS. 1 and 3, a visible region 9 being indicated in FIGS. 4, 5 and 9 for the respective sectional view by dot-dash lines arranged over the surface 6. The visible region 9 indicates a surface region of the plastics material panel 1, which region is or can be visible in the mounted state. Similarly, in FIGS. 4 to 9 dot-dash lines show where in the respective sectional view the first region 11 of the surface 6 and the second region 12 extend. For clarity, the sectional drawings also show the components 5 which are adjacent to the plastics material panel 1 in the mounted state.

As shown in FIG. 4 by way of example, the second region 12 extends within the first region 11 in sectional view A-A. The second region 12 is limited by boundaries 13 which are in turn indicated by auxiliary lines pointing away from the surface 6, and in this example extend in the region of two edges 7a, 7b of the plastics material panel 1. The edges 7a, 7b simultaneously limit an elevation of the plastics material panel, which elevation projects from the visible side 3 and emphasises the decoration in the second region 12 even better. FIG. 4 also shows that the first region 11 is limited by boundaries 10, which are also indicated in FIG. 4 by auxiliary lines pointing away from the plastics material panel 1.

FIG. 5 is a sectional view B-B through a portion of the plastics material panel 1, in which view only the first region 11 of the surface 6, in which region said surface is provided with a high-gloss finish, can be seen. The embodiments in relation to FIG. 4 apply accordingly for the representation of the plastics material panel 1 in sectional views C-C, D-D, E-E and F-F in FIGS. 6 to 9.

Figure 10:
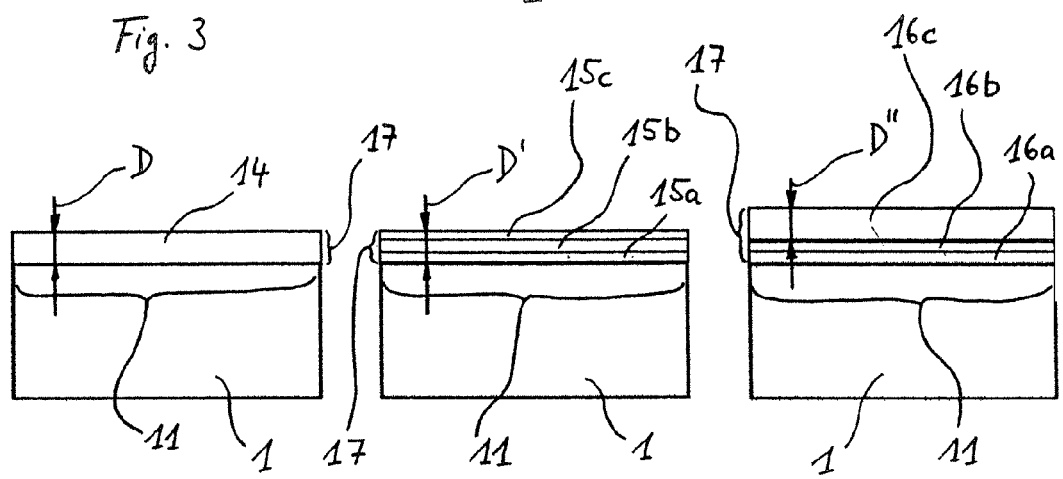
FIG. 10 is a schematic representation of the build-up of coats of a high-gloss finish in a first region of a surface of the plastics material decorative part of FIG. 1, in three variants.

FIG. 10 shows schematically in three variants the build-up of coats of the high-gloss finish in the first region 11 of the surface 6. The plastics material panel 1 according to FIGS. 1 to 9 is preferably provided with a high-gloss finish in the first region 11 in accordance with one of the three variants shown in FIG. 10.

The left-hand sketch in FIG. 10 shows schematically a detail of a plastics material panel 1 which is provided with a high-gloss finish in the first region 11 by means of a coat of lacquer 14 applied to the plastics material panel 1 in the first region 11. In this variant, the coat of lacquer 14 also forms an overall coat of lacquer 17 applied to the plastics material main body. A thickness D of the coat of lacquer 14 is between 10 μm and 50 μm, a thickness D of between 20 μm and 28 μm being preferred.

The middle sketch in FIG. 10 shows schematically a detail of a plastics material panel 1 which is provided with a high-gloss finish in the first region 11 by applying a plurality of coats of lacquer 15a, 15b, 15c one on top of another to the plastics material decorative part. The coats of lacquer 15a, 15b, 15c can be of a coat thickness which is the same or different and together form an overall coat of lacquer 17. In the variant of the middle sketch, an overall thickness D' of the coats of lacquer 15a, 15b, 15c, which thus also denotes the thickness of the overall coat of lacquer 17, is between 10 μm and 50 μm, D' preferably being selected to be between 20 μm and 28 μm.

According to another variant which is shown in the right-hand sketch of FIG. 10, the plastics material panel 1 can also be provided with a high-gloss finish in the first region 11, in such a way that a plurality of coats of lacquer 16a, 16b, 16c are applied one on top of another to the plastics material panel 1, a thickness D" of the uppermost coat of lacquer 16c being between 10 μm and 50 μm. In this variant, D" is preferably selected to be between 20 μm and 28 μm. In this case, the thickness of an overall coat of lacquer 17 which is formed by the individual coats 16a, 16b, 16c is greater than the thickness D" of the uppermost coat of lacquer 16c.

Although the present invention has been described herein in full with reference to preferred embodiments, it is not restricted thereto but can be modified in a variety of ways.

For example, it is conceivable to provide a plurality of second regions which form portions of the first region in which the surface of the plastics material decorative part is provided with a high-gloss finish. In the second regions, similar or different decorations can be applied by hot stamping. A plurality of first regions in which the surface of the plastics material decorative part is provided with a high-gloss finish in the same or a different manner are also conceivable.

It is also conceivable to form not only plastics material decorative parts for motor vehicles in the manner according to the invention, but also decorative parts for example for the passenger region of other vehicles, such as railway vehicles or lifts, and for the interior of aircraft. Plastics material housing components for domestic or kitchen appliances and for entertainment devices, for example for stereo systems or televisions, can also be decorated in the manner according to the invention.

LIST OF REFERENCE NUMERALS 1 plastics material panel
2 fastening means
3 visible side (plastics material panel)
4 hidden side (plastics material panel)
5 adjacent component
6 surface (plastics material panel)
7a edge (plastics material panel)
7b edge (plastics material panel)
9 visible region
10 boundary (first region)
11 first region (surface)
12 second region (surface)
13 boundary (second region)
14 coat of lacquer
15a coat of lacquer
15b coat of lacquer
15c coat of lacquer
16a coat of lacquer
16b coat of lacquer
16c coat of lacquer
17 overall coat of lacquer
D thickness
D' thickness
D" thickness

The invention claimed is:

1. A plastics material decorative part, comprising:
a plastics material main body made by injection molding a thermoplastic polymer, the plastics material main body having a surface, wherein the surface has a first region that has a high-gloss finish, and wherein the surface has a second region which is a subregion of the first region; and
a decoration, which is provided in the second region and applied by hot stamping to the high-gloss finish;
wherein the high-gloss finish is formed by applying a coat of wet lacquer directly to the plastics material main body in the first region, or
wherein the high-gloss finish is formed by applying a plurality of coats of wet lacquer one on top of another directly to the plastics material main body in the first region.

2. The plastics material decorative part of claim 1, wherein the decoration is applied in the second region by heating and simultaneously pressing a hot-stamping foil directly onto the high-gloss finish.

3. The plastics material decorative part of claim 1, wherein the high-gloss finish is formed using a piano lacquer.

4. The plastics material decorative part of claim 1, wherein the second region is limited by a boundary that, at least in portions, is also an edge of the plastics material decorative part.

5. The plastics material decorative part of claim 1, wherein the plastics material decorative part is a trim component for a motor vehicle.

6. The plastics material decorative part of claim 5, wherein the plastics material decorative part is a trim component for a passenger compartment of the motor vehicle.

7. The plastics material decorative part of claim 1, wherein the plastics material decorative part is a plastics material decorative panel that can be mounted in the interior of a motor vehicle so as to be visible, at least in portions.

8. The plastics material decorative part of claim 1, wherein the plastics material decorative part is a plastics material decorative panel for part of a cockpit or centre console of a motor vehicle.

9. The plastics material decorative part of claim 1, wherein the plastics material decorative part is for a motor vehicle.

10. The plastics material decorative part of claim 1, wherein the high-gloss finish is formed by applying the coat of lacquer to the plastics material main body in the first region and the thickness of the coat of lacquer is between 20 µm and 28 µm.

11. The plastics material decorative part of claim 1, wherein the high-gloss finish is formed by applying the plurality of coats of lacquer one on top of another to the plastics material main body in the first region and the overall thickness of the coats of lacquer is between 20 µm and 28 µm.

12. The plastics material decorative part of claim 1, wherein the high-gloss finish is formed by applying the plurality of coats of lacquer one on top of another to the plastics material main body in the first region and the thickness of the outermost coat of lacquer is between 20 µm and 28 µm.

13. The plastics material decorative part of claim 1, wherein the high-gloss finish is formed using a black piano lacquer.

14. The plastics material decorative part of claim 1, wherein the high-gloss finish is formed by applying the coat of lacquer to the plastics material main body in the first region and the thickness of the coat of lacquer is between about 10 µm and about 50 µm.

15. The plastics material decorative part of claim 1, wherein the high-gloss finish is formed by applying the plurality of coats of lacquer one on top of another to the plastics material main body in the first region and wherein the overall thickness of the plurality of coats of lacquer is between about 10 µm and about 50 µm or the thickness of the outermost coat of lacquer is between about 10 µm and about 50 µm.

16. A plastics material decorative part, comprising:

a plastics material panel produced by injection molding a thermoplastic polymer, the plastics material panel having a surface, wherein the surface has a first region that has a high-gloss finish formed by applying a coat of wet lacquer directly to the plastics material panel or formed by applying a plurality of coats of wet lacquer one on top of another directly to the plastics material panel and thereby finishing the surface of the plastics material panel in the first region;

a second region that is a subregion of the first region; and a decoration provided in the second region by hot stamping, wherein the decoration has been transferred from a hot-stamping foil directly onto the high-gloss finish.

17. The plastics material decorative part of claim 16, wherein the high-gloss finish is formed using a black piano lacquer.

18. The plastics material decorative part of claim 16, wherein the thickness of the coat of lacquer directly applied to the plastics material panel in the first region is between about 20 µm and about 28 µm.

19. The plastics material decorative part of claim 16, wherein the high-gloss finish is formed using the plurality of coats of lacquer with the overall thickness between about 20 µm and about 28 µm or with the thickness of the outermost coat of lacquer between about 20 µm and about 28 µm.

20. A plastics material decorative part, comprising:

a plastics material main body made of a thermoplastic polymer by injection molding and having a surface, wherein the surface has a first region that has a high-gloss finish, and wherein the surface has a second region that is a subregion of the first region;

a decoration provided in the second region and applied by heating and simultaneously pressing a hot stamping foil onto the high-gloss finish;

wherein the high-gloss finish in the first region is formed by applying wet lacquer directly to the surface of the plastics material main body in the first region.

* * * * *